July 22, 1969  P. KEHLER  3,456,750
SELF-BURYING TRACKED VEHICLE

Filed July 24, 1967  2 Sheets-Sheet 1

*INVENTOR.*

PAUL KEHLER

July 22, 1969     P. KEHLER     3,456,750

SELF-BURYING TRACKED VEHICLE

Filed July 24, 1967     2 Sheets-Sheet 2

*INVENTOR.*

PAUL KEHLER

United States Patent Office 3,456,750
Patented July 22, 1969

3,456,750
SELF-BURYING TRACKED VEHICLE
Paul Kehler, 6752 Sy Road, Niagara Falls, N.Y. 14304
Filed July 24, 1967, Ser. No. 661,158
Int. Cl. B62d 11/10, 55/00
U.S. Cl. 180—6.7                                           2 Claims

ABSTRACT OF THE DISCLOSURE

A power driven vehicle having a plurality of side by side ground-engaging endless track members suspended in a manner so that the entire lower surface as well as the forward and the aft face of the vehicle are covered by these tracks, with differential drive means causing each inner track to be driven at a speed intermediate the speed of its two adjacent tracks when the vehicle is maneuvering above the surface, and means to cause the tracks to alternately move in opposite directions, thereby excavating the ground underneath the vehicle and lowering it into the resulting pit for protection.

---

Armor protection of military vehicles is limited by the weight penalty imposed on these vehicles by this armor. A heavily shielded vehicle has to carry, in addition to the weight of its armor, powerful engines and a large fuel supply. The resulting size and weight reduce its mobility and maneuverability.

Protection is not always the most desirable property of military vehicles. Often, it is their mobility and maneuverability which is more important. An agile and maneuverable light vehicle, capable of rapidly digging itself into the ground whenever the need for protection arises, would constitute a great improvement over present designs. This same concept is widely used by foot soldiers who protect themselves in foxholes when not on the move.

A highly mobile and maneuverable vehicle, capable of rapidly digging itself into the ground for protection, is the object of this invention. This vehicle employs a plurality of tracks completely across its underside and its forward and aft faces. When it is desired to dig in rather than to move forward, alternate tracks are driven in reverse directions. The track design, not an object of this invention, is such that the ground under the vehicle is rapidly dug out, lowering the vehicle into the resulting pit. Since all of the tracks of the vehicle are powered, it can be moved out of the pit easily by driving all of the tracks in the same direction and at the same speed.

One object of this invention is to provide a method of suspending a plurality of powered inner tracks in such a way that they cover substantially the whole underside as well as the forward and the aft faces of the main body of the vehicle, and to suspend two powered outer tracks in such a way that they cover and protect the supporting structure between the suspension system and the main body of the vehicle, as well as the power drive mechanism of the tracks.

Another object of this invention is to provide a system of differential gears, to be employed in the fully tracked vehicle in such a manner that all tracks, outer as well as inner ones, are driven individually at such a rate which is required for any maneuver, or are driven alternately in different directions.

The novel features which I believe to be characteristic of this invention are set forth in the appended claims. The principles of the invention, however, are best understood from the following description of a specific embodiment of the invention, read in connection with the accompanying drawings, in which:

Figure 1:
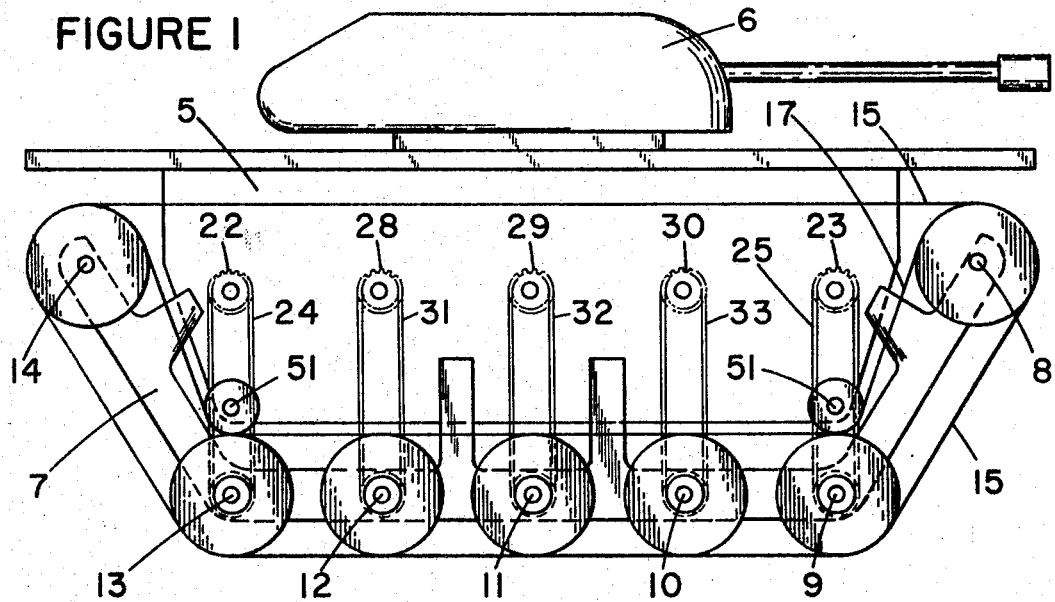
FIGURE 1 is the side elevation of the embodiment of the invention.
Figure 2:
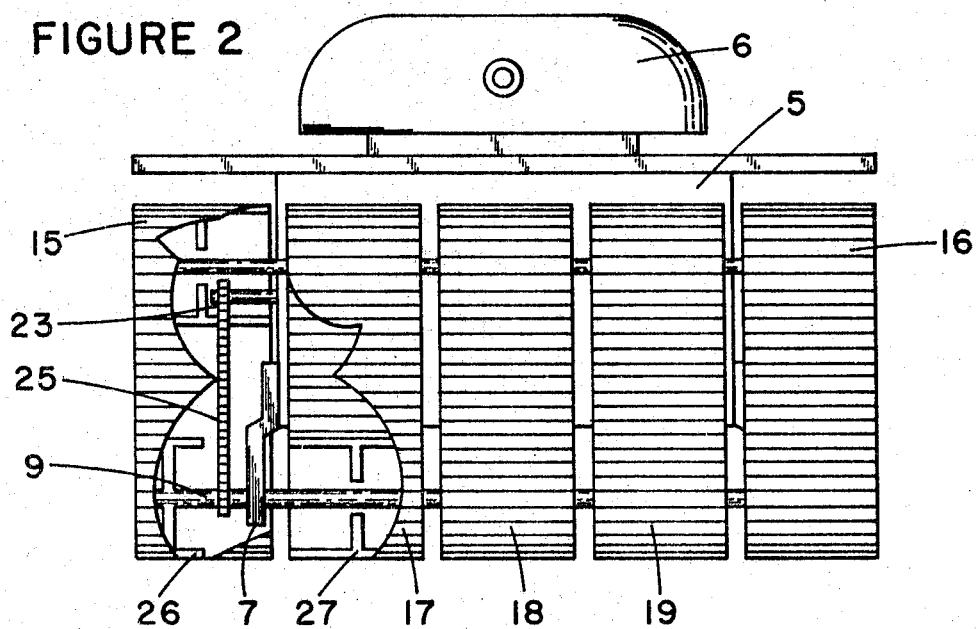
FIGURE 2 is the front elevation of the embodiment shown in FIGURE 1, with parts of one outer track and one inner track removed.
Figure 3:
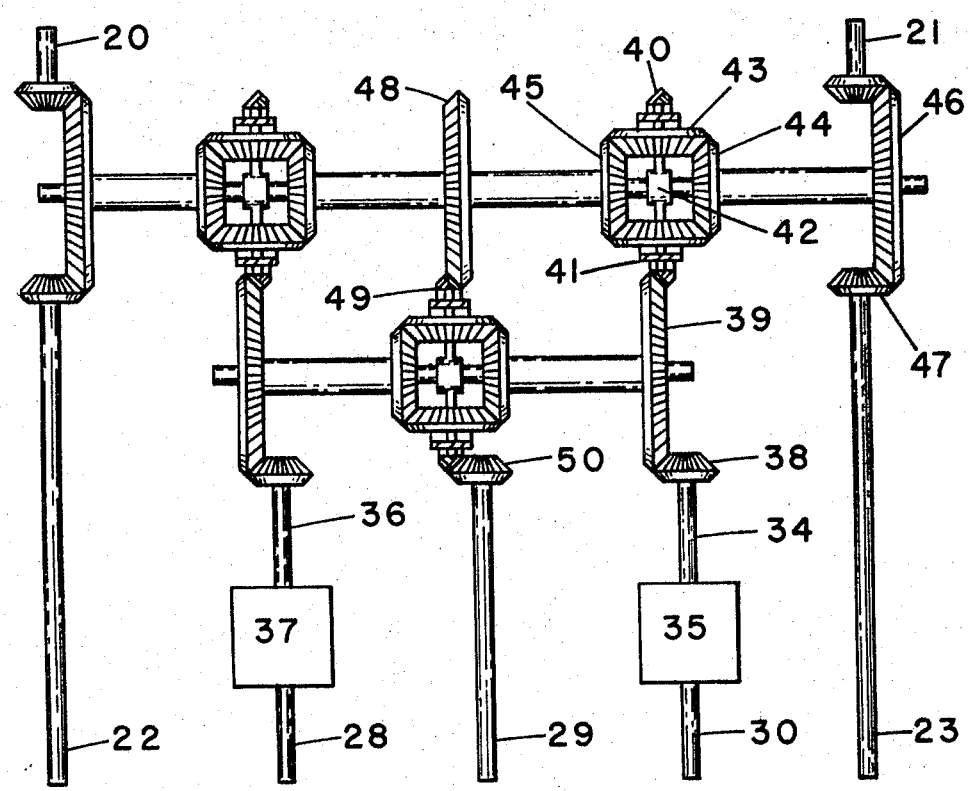
FIGURE 3 is a plan view of the differential gear system employed by the embodiment shown in FIGURE 1 and FIGURE 2.
Figure 4:
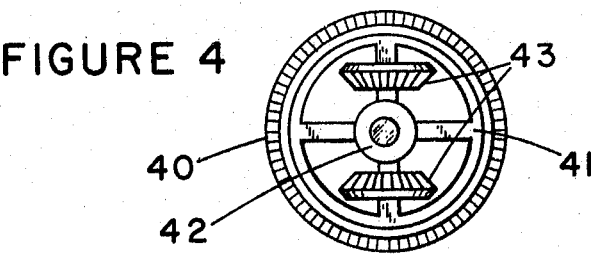
FIGURE 4 is the side elevation of a wheel, such as used in the differential bevel gear trains of the differential gear system shown in FIGURE 3.

Reference will now be made by using numerals which designate corresponding parts shown in the FIGURES 1, 2, 3, and 4.

The vehicle shown in these figures consists of a body 5 to which is attached a turret 6 and a frame 7. The frame 7 carries the suspension system of the tracks, consisting of a plurality of wheels mounted on the axles 8, 9, 10, 11, 12, 13, and 14. On the wheels are mounted the outer tracks 15 and 16 and the inner tracks 17, 18, and 19. These tracks cover substantially the whole underside as well as the forward and the aft face of the vehicle. The outer tracks 15 and 16 form a larger loop than the inner tracks and enclose the support structure 7, the powered drive shafts 22, 23, 28, 29, and 30, and the drive chains 24, 25, 31, 32, and 33. The inner tracks form a trough enclosing the main body 5. Idling rollers 51 prevent the inner tracks 17, 18, and 19 from coming in contact with the main body 5.

Power plants that are not an object of this invention, drive the shafts 20 and 21 and thereby the shafts 22 and 23 which are connected, through the chains 24 and 25, to the axles 13 and 9. Axle 9 is rigidly connected to wheel 26 which is engaged with track 15, and carries the free wheeling wheel 27 for supporting the track 17, as well as three other free wheeling wheels for the support of the tracks 16, 18, and 19. Similarly, the shaft 22 is powering, through chain 24 and axle 13, the other outer track 16. The shafts 28, 29, and 30 are connected through the chains 31, 32, and 33 to the axles 12, 11, and 10, and apply power to the inner tracks 17 18, and 19.

The shaft 30 is connected to shaft 34 by the reversing gear box 35. This reversing gear box is not an object of this invention, but causes the shaft 30 to rotate at the same speed as shaft 34, in either the same or in opposite direction of shaft 34. Similarly, the shaft 28 is connected to shaft 36 by the gear box 37.

A bevel pinion 38 is attached to shaft 34 and engages the bevel gear 39, which, in turn, engages the bevel gear 40 which is mounted on the rim 41 of a wheel 42. The spokes of this wheel serve as the spider of a differential bevel gear train comprising the pinions 43 and the bevel gears 44 and 45. The well known operating principle of such a differential bevel gear train will cause the wheel 42 to rotate at a speed that is intermediate the speeds of the bevel gears 44 and 45. Since bevel gear 44 is connected to shaft 23 through the bevel gear 46 and the pinion 47, and the bevel gear 45 is connected to shaft 29 through the bevel gear 48, the circumferential bevel gear 49, and the pinion 50, the shaft 34 will rotate at a speed which is intermediate the speeds of the shafts 23 and 29.

It can be shown similarly, that the shaft 29 will rotate at a speed intermediate the speeds of the shafts 34 and 36, and that the shaft 36 will rotate at a speed intermediate the speeds of the shafts 22 and 29. Therefore, whenever the gear boxes 35 and 37 are causing the shafts 30 and 28 to rotate in the same direction as the shafts 34 and 36, the inner tracks of the vehicle, powered by the shafts 28, 29, and 30, will move at a proper speed and in the proper direction during any desired maneuver of the vehicle, no matter whether the outer tracks, which are powered by the shafts 22 and 23, are powered in the same or in opposite direction, at the same or at different speeds.

When both of the outer tracks are driven (by the shafts 22 and 23) in the same direction at the same speed, and when the gear boxes 35 and 37 are causing the shafts 28 and 30 to move in the same direction as the shafts 36 and 34, then all of the tracks of the vehicle will have identical speed and direction of motion, and the vehicle will move in a straight line. However, when the gear boxes 35 and 37 are causing the shafts 28 and 30 to move in opposite direction to the shafts 36 and 34, then alternate tracks of the vehicle will also move in opposite directions, and the vehicle will dig itself into the ground.

The preceding description and the FIGURES 1, 2, 3, and 4 show how a vehicle could be designed that has its whole underside as well as its forward and aft faces covered by tracks, these tracks being powered individually with differentiated speeds that correspond to any desired maneuver on the surface, or powered in opposite directions to cause the vehicle to lower itself under the surface for protection. Although this specific embodiment of the invention has been illustrated and described, it is understood that various alterations in the details of construction can be made without departing from the scope of the invention which is indicated in the appended claims.

I claim:

1. A vehicle comprising a main body, a support structure, and a track suspension system, said support structure extending downward as well as forward and aft from the main body and supporting the track suspension system, said suspension system suspending a plurality of inner tracks between the support structure, and two outer tracks on the outer sides of the support structure, said tracks covering substantially the whole underside as well as the forward and the aft face of the vehicle, with said outer tracks extending along the sides of said main body forming a larger loop than said inner tracks and enclosing said support structure and powered drive shafts, said inner tracks forming a trough extending over the underside of the vehicle as well as over its forward and aft faces.

2. A vehicle comprising a main body, a support structure, and a track suspension system, said track suspension system carrying a plurality of inner tracks and two outer tracks, said inner and outer tracks covering substantially the whole underside as well as the forward face and the aft face of the vehicle, drive means for individually driving said outer tracks in the same or in opposite directions at the same or at different speeds, driven means for driving said inner tracks, and differential drive means for transmitting power from said drive means for individually driving said outer tracks to said driven means of said inner tracks for causing each of said driven means for driving a said inner track to rotate with a speed that is intermediate the speeds of the two driven means for driving the two tracks adjacent to said inner track, when said outer tracks are driven at different speeds, said differential drive means including a plurality of epicyclic bevel gear means, one of said epicyclic bevel gear means operably connected to each of said driven means of said inner tracks, said drive means for said outer tracks and alternate said driven means of said inner tracks directly connected to their corresponding tracks, and the remaining of said driven means of said inner tracks connected to their corresponding tracks through a reversing means, said reversing means causing said inner tracks connected to said remaining of said driven means to move either in the same or in opposite direction to said remaining of said driven means, for causing all of the tracks to move at the same speed and in the same direction when said reversing means are not actuated and for causing all of the tracks to move at the same speed but alternately in opposite directions when said reversing means are actuated and when said outer tracks are driven at the same speed and in the same direction.

References Cited

UNITED STATES PATENTS

| 1,318,189 | 1/1919 | Tritton | 180—6.7 |
| 1,749,276 | 3/1930 | Edmonds | 115—1 |
| 2,154,377 | 4/1939 | Cory | 305—20 X |

FOREIGN PATENTS

| 463,634 | 8/1928 | Germany. |

LEO FRIAGLIA, Primary Examiner

JOHN A. PEKAR, Assistant Examiner

U.S. Cl. X.R.

180—9.2